(12) United States Patent
Zumsteg

(10) Patent No.: US 7,688,747 B2
(45) Date of Patent: *Mar. 30, 2010

(54) SUB-FRAME SYNCHRONIZED RESIDUAL RANGING

(75) Inventor: Philip J. Zumsteg, Shorewood, MN (US)

(73) Assignee: Honeywell International Inc., Morristown, NJ (US)

( * ) Notice: Subject to any disclaimer, the term of this patent is extended or adjusted under 35 U.S.C. 154(b) by 546 days.

This patent is subject to a terminal disclaimer.

(21) Appl. No.: 11/468,462

(22) Filed: Aug. 30, 2006

(65) Prior Publication Data

US 2008/0056308 A1    Mar. 6, 2008

(51) Int. Cl.
*H04J 1/16* (2006.01)
(52) U.S. Cl. .................. 370/252; 370/241; 370/310; 370/312; 342/458
(58) Field of Classification Search .......... 370/241, 370/246–252, 310; 367/19; 342/458
See application file for complete search history.

(56) References Cited

U.S. PATENT DOCUMENTS

| | | | |
|---|---|---|---|
| 3,813,496 A | | 5/1974 | Maillet |
| 4,021,780 A | * | 5/1977 | Narey et al. ............ 235/54 F |
| 5,485,163 A | | 1/1996 | Singer et al. |
| 5,508,708 A | | 4/1996 | Ghosh et al. |
| 5,512,908 A | | 4/1996 | Herrick |
| 5,926,765 A | | 7/1999 | Sasaki |
| 5,952,969 A | | 9/1999 | Hagerman et al. |
| 5,973,643 A | | 10/1999 | Hawkes et al. |
| 6,006,097 A | | 12/1999 | Hornfeldt et al. |
| 6,011,974 A | | 1/2000 | Cedervall et al. |
| 6,031,490 A | | 2/2000 | Forssen et al. |
| 6,034,635 A | | 3/2000 | Gilhousen |
| 6,052,597 A | | 4/2000 | Ekstrom |
| 6,061,021 A | | 5/2000 | Zibell |
| 6,084,547 A | | 7/2000 | Sanderford et al. |
| 6,108,553 A | | 8/2000 | Silventoinen et al. |
| 6,121,928 A | | 9/2000 | Sheynblat et al. |
| 6,127,945 A | | 10/2000 | Mura-Smith |
| 6,167,276 A | | 12/2000 | Pite |
| 6,169,497 B1 | | 1/2001 | Robert |
| 6,172,644 B1 | | 1/2001 | Stilp |
| 6,188,354 B1 | | 2/2001 | Soliman et al. |
| 6,195,046 B1 | | 2/2001 | Gilhousen |

(Continued)

FOREIGN PATENT DOCUMENTS

JP            4023644          1/1992

OTHER PUBLICATIONS

Barrett, Terence, "History of Wideband (UWB) Radar & Communications: Pioneers and Innovators".

(Continued)

*Primary Examiner*—William Trost, IV
*Assistant Examiner*—Ashil Farahmand
(74) *Attorney, Agent, or Firm*—Fogg & Powers LLC

(57) ABSTRACT

A method of ranging between nodes is provided. The method includes synchronizing two or more nodes with a frame preamble. Exchanging data and ranging schedule between the nodes without an additional frame preamble. Starting a schedule clock in each node in response to a switch point and exchanging one or more range signals between nodes based on the ranging schedule.

20 Claims, 8 Drawing Sheets

U.S. PATENT DOCUMENTS

| | | | |
|---|---|---|---|
| 6,243,587 | B1 | 6/2001 | Dent et al. |
| 6,243,588 | B1 | 6/2001 | Koorapaty et al. |
| 6,249,253 | B1 | 6/2001 | Nielsen et al. |
| 6,256,505 | B1 | 7/2001 | Kingdon et al. |
| 6,275,471 | B1* | 8/2001 | Bushmitch et al. .......... 370/248 |
| 6,275,705 | B1 | 8/2001 | Drane et al. |
| 6,282,427 | B1 | 8/2001 | Larsson et al. |
| 6,285,321 | B1 | 9/2001 | Stilp et al. |
| 6,292,516 | B1 | 9/2001 | Petsko et al. |
| 6,321,091 | B1 | 11/2001 | Holland |
| 6,330,452 | B1 | 12/2001 | Fattouche et al. |
| 6,331,825 | B1 | 12/2001 | Ladner et al. |
| 6,342,854 | B1 | 1/2002 | Duffett-Smith et al. |
| 6,347,228 | B1 | 2/2002 | Ludden et al. |
| 6,381,464 | B1 | 4/2002 | Vannucci |
| 6,404,388 | B1 | 6/2002 | Sollenberger et al. |
| 6,421,009 | B2 | 7/2002 | Suprunov |
| 6,593,883 | B2 | 7/2003 | Johnson et al. |
| 6,611,233 | B2 | 8/2003 | Kimura |
| 6,822,951 | B1 | 11/2004 | Patton |
| 7,376,045 | B2* | 5/2008 | Falkenberg et al. ........... 367/19 |
| 2001/0040702 | A1 | 11/2001 | Leung |
| 2002/0027896 | A1 | 3/2002 | Hughes et al. |
| 2003/0198212 | A1 | 10/2003 | Hoctor et al. |
| 2005/0024038 | A1* | 2/2005 | Santhoff et al. ............. 324/118 |
| 2005/0026563 | A1 | 2/2005 | Leeper et al. |
| 2005/0030931 | A1* | 2/2005 | Sung et al. .................. 370/342 |
| 2005/0063328 | A1 | 3/2005 | Dunagan et al. |
| 2005/0096031 | A1* | 5/2005 | Sugaya et al. ............ 455/422.1 |
| 2005/0135284 | A1* | 6/2005 | Nanda et al. ................ 370/294 |
| 2005/0271150 | A1 | 12/2005 | Moore et al. |
| 2005/0276319 | A1 | 12/2005 | Akiyama et al. |
| 2006/0187909 | A1* | 8/2006 | Sho et al. .................... 370/389 |
| 2006/0291537 | A1 | 12/2006 | Fullerton et al. |
| 2007/0232339 | A1* | 10/2007 | Ji et al. ....................... 455/502 |
| 2007/0253400 | A1* | 11/2007 | Zumsteg ..................... 370/350 |
| 2008/0056308 | A1 | 3/2008 | Zumsteg |

OTHER PUBLICATIONS

Fontana, Robert J., "A Brief History of UWB Communications", , Publisher: Multispectral Solutions, Inc.

Girod, Lewis, "Localization", , Publisher: Distributed Embedded Systems.

"802.15.3 MAC layer Overview and Proposed Enhancements to Support UWB PHY", , Publisher: Mobile and Portable Radio Research Group, Virgina Tech, Published in: US.

Lee, K.K., "UWB Overview ", , p. 80.

Pomalaza-Raez, Carlos et al., "A Unified Approach to Dynamic TDMA Slot Assignment and to Distributed Routing for Multi-Hop Packet Radio Networks".

Somayazulu, V. Srinivasa et al., "Design Challenges for Very High Data Rate UWB Systems", , Publisher: Intel Labs, Published in: Hillsboro, OR.

Webb, Warren, "Ultrawideband: An Electronic Free Lunch?", Dec. 21, 2000, pp. 85-92, Publisher: EDN, Published in: US.

Young, C. David, "USAP Multiple: Dynamic Resource Allocation for Mobile Multihop Multichannel Wireless Networking", , pp. 1-5, Publisher: IEEE.

Guvenc, L.; Sahinoglu, Z.; Molisch, A.F.; Orlik, R, "Non-Coherent TOA Estimation in IR-UWB Systems With Different Signal Waveforms", "Broadnets 2005, 2nd International Conference", Oct. 2005, pp. 1168-1174, vol. 2, Publisher: Broadband Networks, 2005.

Wikipedia, "MAC Address", Apr. 1, 2005, Publisher: Wikipedia.

Wotel, Paul, "The Difference Between Half and Full Duplex Explained", Apr. 11, 2005, Publisher: HelloDirect.

\* cited by examiner

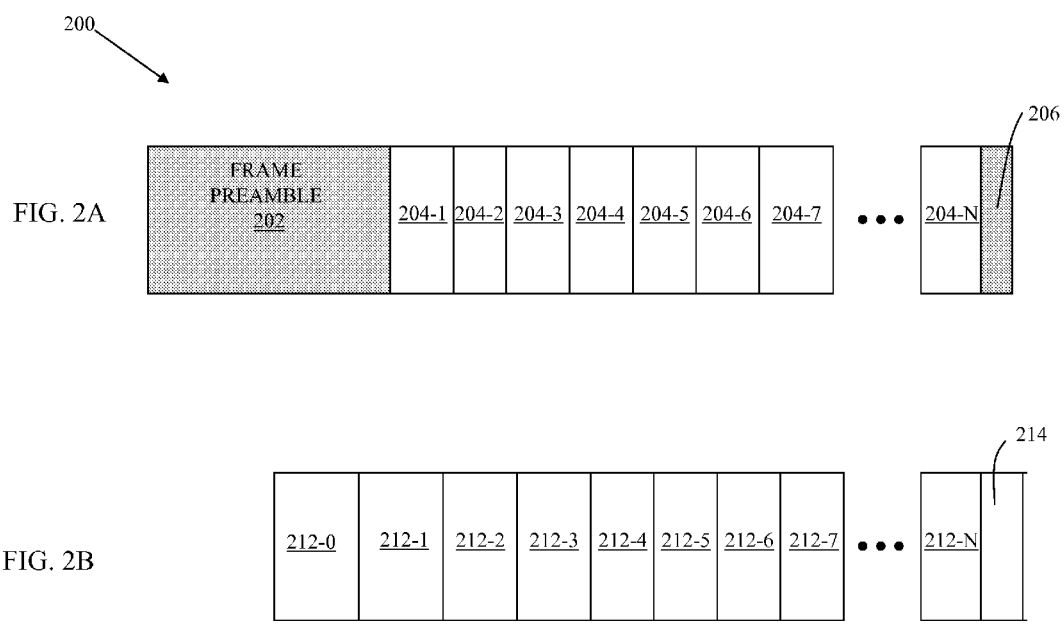

SUB-FRAME SYNCHRONIZED RESIDUAL RANGING

BACKGROUND

In many wireless networks, each node may have a need to determine the position of the node, relative to absolute and relative frames of reference. One system providing an absolute frame of reference is the Global Positioning System (GPS), using a constellation of geosynchronous satellites to provide the necessary coordinate reference points. Relative frames of reference are provided by asset tracking systems, such as those monitoring the movement of cooperating devices in a structure, for determining the building-relative position coordinates of a pre-mounted tagging device. Current systems for providing absolute and relative frames of reference typically require the cost and installation of infrastructure equipment, from satellites to fixed location beacons mounted in a structure, as used in many tracking systems.

Ad hoc wireless networks are characterized by the absence of installed infrastructure, and possibly unpredictable orientation and location of wireless devices in these networks. Such systems typically provide only a limited relative frame of reference, with respect to other devices in the ad hoc network. Certain ad hoc network nodes may be augmented with GPS to provide a fixed coordinate system, and hence an absolute frame of reference. However, the size and power requirements necessary for GPS are typically unavailable in energy-constrained ad hoc wireless devices. Also, the unpredictable orientation of the GPS antenna in a device, or a location without suitable GPS signals, may result in a failure to acquire sufficient GPS satellite signals for an accurate position determination by the node. Further, applications implemented with ad hoc wireless network may only require a relative, not an absolute, frame of reference, such as perimeter monitoring or surveillance.

In many position determination systems such as GPS, tagged asset tracking and ad hoc wireless networks, the propagation velocity of a radio frequency (RF) signal is ideally used to measure the line-of-sight distance between pairs of cooperating nodes. In air, the approximate velocity of a radio wave is one foot per nanosecond (1 ft./nSec), and the distance between a transmitter and one or more cooperating receivers may be measured using methods such as Time of Flight (TOF) or Time Difference of Arrival (TDOA). The results of such TOF ranging measurements between three nodes are required, at a minimum, for trilateration to determine the position of just a single other device in systems with some fixed infrastructure. More generally, many such TDOA ranging measurements are required to perform multilateration, such as required to determine the position of each device in an ad hoc wireless network. Therefore, the accuracy of such ranging measurements is a function of the clock precision utilized for each ranging measurement.

The use of conventional, or data modulated RF bands or channels, for measuring TOF or TDOA may produce inaccurate results due to various influences and effects. Multi-path RF propagation may result in the receiver detecting a higher strength, but not a line-of-sight path RF signal, and the measured time interval will have a larger value than for the line-of-sight RF wave path distance. Also, clock synchronization among the devices must be accomplished and maintained, typically through the use of a beacon signal transmitted by a designated node. Since such clocks are typically used for the purpose of providing a time base for demodulating data having a modulation frequency orders of magnitude lower than the carrier frequency, the clock is not able to resolve individual cycles of the carrier frequency. Hence, the precision of such ranging measurements is limited to an indirect detection of modulated data contained in a beacon signal, rather than arrival of a cycle at the carrier frequency. Further, each beacon signal will include a preamble appropriate for the data modulation technique employed. Since the signal quality at each receiver of the beacon signal may differ, the time required to achieve good synchronization with this preamble may differ from one receiver to another. As a result, the distance measurement will have an additional timing error due to the variation in response at each receiver, especially when multiple timing measurements are required, such as for trilateration and multilateration.

Some wireless data communications systems, such as conventional radio frequency systems, provide data communications by modulating, or coding, data signals onto a carrier frequency(s). However, other types of wireless communication systems are carrier-less and rely on time-based coding for data communications. One such communication system that relies on time-based coding to achieve reliable data communications is Ultra Wide Band ("UWB"). These UWB systems, unlike conventional radio frequency communications technology, do not use modulated carrier frequencies to transport data. Instead, UWB systems make use of a wide band energy pulse that transports data using both time-based coding and signal polarization. Time-based coding methods may include pulse-position, pulse-rate or pulse-width techniques.

UWB communication systems do not provide a common clock to the transmitting and receiving nodes. Instead, a low-drift clock with a programmable offset value is implemented in each transmitter/receiver node, providing a local reference for time-based coding and decoding. Each of these multiple clock domains is subject to short-term time drift, which will exceed the necessary tolerance for accurate UWB data communication system operation after a predictable time period. As a result, precise time synchronization between the transmitting node and receiving node(s) is imperative in UWB systems to obtain accurate data communications. In order to precisely synchronize one or more receivers (Rx) nodes with a transmitting node (Tx), UWB systems typically require preambles for each transmitted data frame. During the preamble, the programmable offset value is adjusted to minimize the error between the receiving node's clock and the clock used by the node transmitting the preamble. For some period of time after synchronization using a frame preamble the transmitter and receiver (or receivers) are able to exchange time-synchronous data.

At some point in time, the synchronization of the low-drift clocks will diverge sufficiently to increase the data error rate such that unreliable time-synchronous data communications occurs. A node must then transmit another frame preamble to enable the communicating nodes to re-synchronize their low-drift clocks for subsequent time-synchronous communications. Some applications with potential to benefit from UWB technology cannot be implemented if a preamble is required, due to the time and energy required for a preamble, during which no data is exchanged. Also, many potential applications for UWB technology are size and energy constrained, such as networks of wireless sensors and controls, which seek to minimize transmission time and to conserve energy.

While certain classes of applications require accurate timing to determine distances between nodes in a wireless sensor network (i.e. multi-static radar, geo-location, etc.) other applications exist for which a lower-precision timing capability is suitable for determining ranges (e.g. acoustic localization, seismic tracking, surveillance, etc.) For time-synchronized UWB data communications, each node's clock must have a precision in the sub-nanosecond range. This clock precision will be highest immediately following a time-synchronization preamble, then drift over time to a lower precision, until clock-synchronization is inadequate for UWB data communications. The lower precision timing range may be in the range of nano-seconds to milli-seconds, capable of supporting one or more of the class of applications requiring lower-precision timing. Since a wireless sensor network may be required to exchange data as well as measuring ranges, a method for achieving both, while minimizing energy consumption is essential to maximize the operational lifetime of a wireless sensor network node, many of which are battery-powered.

For the reasons stated above, and for other reasons stated below which will become apparent to those skilled in the art upon reading and understanding the present specification, there is a need in the communication industries for a method to provide collaboration among two or more transmitter/receiver nodes that utilizes the clock synchronization mechanism required for time-synchronous communication systems to provide ranging after the time-synchronous data exchange has been completed following a frame preamble.

SUMMARY

The above-mentioned problems of current wireless communication systems are addressed by embodiments of the present invention and will be understood by reading and studying the following summary and specification. The following summary is made by way of example and not by way of limitation. It is merely provided to aid the reader in understanding some of the aspects of the invention. In one embodiment, a method of ranging between nodes is provided. The method includes synchronizing two or more nodes with a frame preamble. Exchanging data and ranging schedule between the nodes without an additional frame preamble. Starting a schedule clock in each node in response to a switch point and exchanging one or more range signals between nodes based on the ranging schedule.

DRAWINGS

The present invention can be more easily understood and further advantages and uses thereof more readily apparent, when considered in view of the description of the preferred embodiments and the following figures in which:

FIG. 2A is a diagram of an initial communication sub-frame of one embodiment of the present invention;

FIG. 2B is a diagram of a ranging sub-frame signal of one embodiment of the present application.

In accordance with common practice, the various described features are not drawn to scale but are drawn to emphasize specific features relevant to the present invention. Reference characters denote like elements throughout Figures and text.

DETAILED DESCRIPTION

Figure 1A:
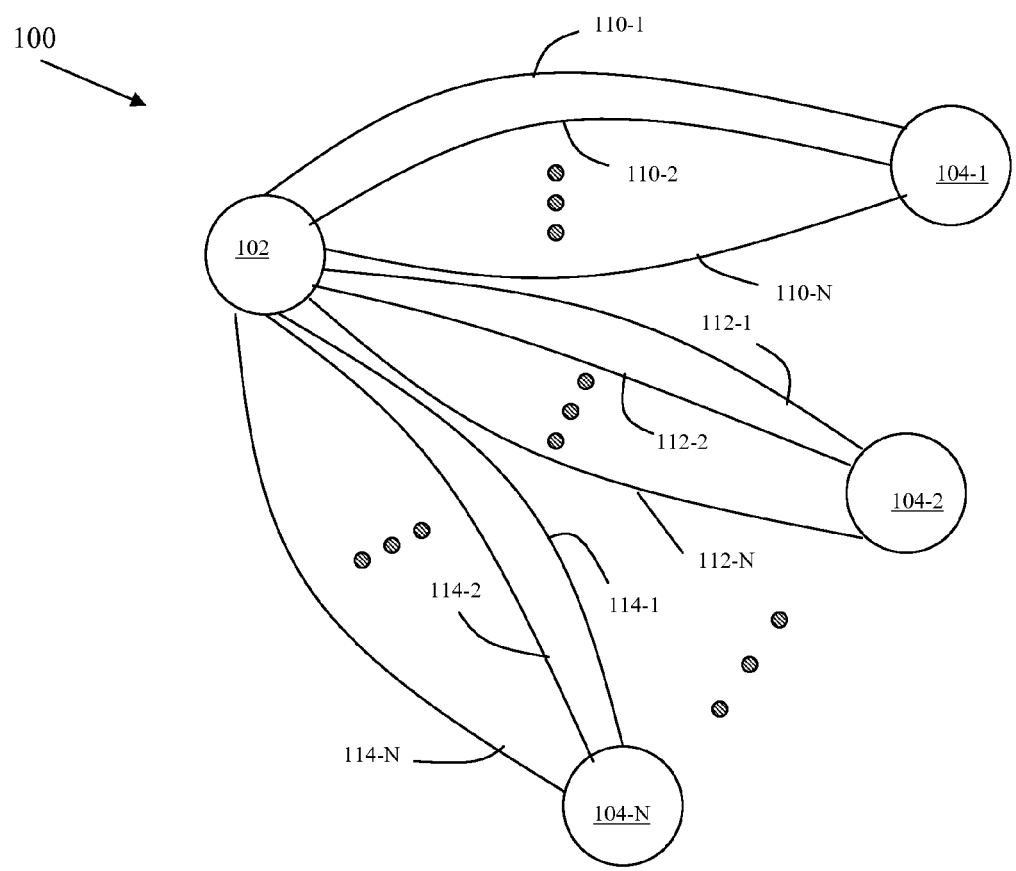
FIG. 1A is a diagram of one embodiment of a communications system of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide methods and systems for efficiently using time-synchronized communications systems for data communication as well as ranging applications. The present invention is related to the Sub-Frame Synchronized Signaling (SFSS) application filed on Dec. 28, 2005, having Ser. No. 11/181,281 (the '281 application) which is herein incorporated by reference. The Sub-Frame Synchronized Signaling application provides methods and apparatus for sub-frame synchronized signaling that avoid many of the long resynchronization periods caused by preambles at the start of each transmission frame. In embodiments of the present invention, once synchronization of communication among cooperating nodes has been established, accurate ranging measurements may be made in an efficient manner, even after exceeding the time-synchronization precision necessary for reliable data communications.

Sub-Frame Synchronized Residual Ranging (SFSRR) utilizes the Sub-Frame Synchronized Signaling method, as described in the '281 application, to first communicate, as needed, a schedule of transmissions to every node, then issue a "switch point" signal to cause all collaborating nodes to participate in a ranging application. Each such communicated frame is preceded with a frame preamble for the purpose of enabling clock synchronization among cooperating nodes. The duration of the frame preamble must be long enough to enable two or more nodes to achieve time-synchronization, even when the local clocks in those nodes have the maximum possible time difference.

The transmission schedule accurately determines which node should transmit one or more ranging signals during the period of time following the period of time-synchronized data exchange among the nodes in the current communications frame, as indicated by the switch point issued to indicate the start of residual ranging. The period of time from the switch point until the next frame preamble is transmitted, by any node, is the residual synchronization period. One or more nodes may transmit ranging signals during the residual synchronization period, in accordance with the schedule of transmissions exchanged during the time-synchronized data exchange.

Each ranging signal is transmitted at the scheduled time after the switch point, and only one node is scheduled to transmit during a given time interval of the residual synchronization period. All other nodes are in receive mode during the transmission interval of the scheduled transmit node. The number and duration of the transmitted ranging signals depends, among other factors, the maximum range to be measured, and desired measurement accuracy, and is not a limitation of the present invention.

Ranges between a transmitting and one or more receiving nodes are determined at each receiving node by measuring the elapsed time between the scheduled time of signal transmission, and time at detection of the ranging signal by a receiving node. The elapsed time for each receiving node is determined using the local time-synchronized clocks in the receiving nodes. As described in the '281 application, the local clocks in all nodes are time-synchronized to the clock in the node transmitting the initial communication message, during the frame preamble. In the present invention, each node then stores a copy of this initial clock offset value, which is used to determine the range between this node and each other cooperating node, by computing a range based on the estimated propagation velocity of RF waves in air and the difference between the scheduled transmission time and the time at which the signal is received by a node. As those of skill in the art will understand, this method enables one or more receiving nodes to simultaneously measure the range to the node transmitting the ranging signal.

In FIG. 1A an embodiment of a data communications system 100 of the present invention is illustrated. In this embodiment, the data communication system 100 includes communication node 102 and communication nodes 104-1 through 104-N. The communication nodes 102 and 104-1 though 104-N are adapted to communicate with each other. In particular, in the embodiment illustrated in FIG. 1A, communication node 102 is in communication with communication nodes 104-1 through 104-N. However, it will be understood that the present invention can generally apply to two or more communication nodes, any of which may be the initial transmitting node. In embodiments of the present invention, a first communication node initiates a message exchange. In the embodiment of FIG. 1A, this is communication node 102. A message exchange is started when communication node 102 transmits a communication signal that contains a frame preamble. The frame preamble is a known sequence of information that includes information regarding clock timing. Each receiving node uses the information in the frame preamble to synchronize its local clock so communication between the transmitting node and the receiving nodes can occur. In embodiments of the present invention, communication between nodes is maintained without sending an additional frame preamble until internal clocks in the respective nodes have drifted apart far enough that synchronization suitable for UWB data communications has been lost.

Referring back to FIG. 1A, the first communication signals 110-1, 112-1 and 114-1 containing the frame preambles and other data to be exchanged are illustrated, such as a schedule for the residual synchronization period. The first communication signals may be referred to as frame synchronization communication signals. Node 102 is the transmitting node when transmitting signals 110-1, 112-1 and 114-1 and nodes 104-1 through 104-N are the receiving nodes when receiving the respective frame communication signals 110-1, 112-1 and 114-1. At the end of each frame communication signal is an indication that the signal is complete. As described in the '281 application, this is referred to a switch point. A particular switch point provides a signal to each receiving node indicating the start of the residual synchronization period. Each node receiving the switch point refers to the previously exchanged schedule to determine when it can become a transmitting node to transmit a communication signal, such as a ranging signal. An example of this are ranging signals 110-2, 112-2 and 114-2 transmitted from the respective nodes 104-1, 104-2 and 104-N back to node 102 one after another in a pre-arranged sequence. The message exchange between the nodes continues like this until, as discussed above, the internal clocks in the respective nodes have drifted far enough apart that time-synchronization suitable for ranging has been lost, or until another node transmits a new initial communication containing a frame preamble. The last ranging signal between initiating node 102 and nodes 104-1 through 104-N is illustrated as signals 110-N, 112-N and 114-N in FIG. 1A. As those of skill in the art will understand, the multiplicity of ranging signals transmitted by a particular node may be sent in a sequence, with no intervening transmissions by other nodes, or interleaved with transmissions by other nodes, according the schedule, and all without limitation.

Figure 1B:
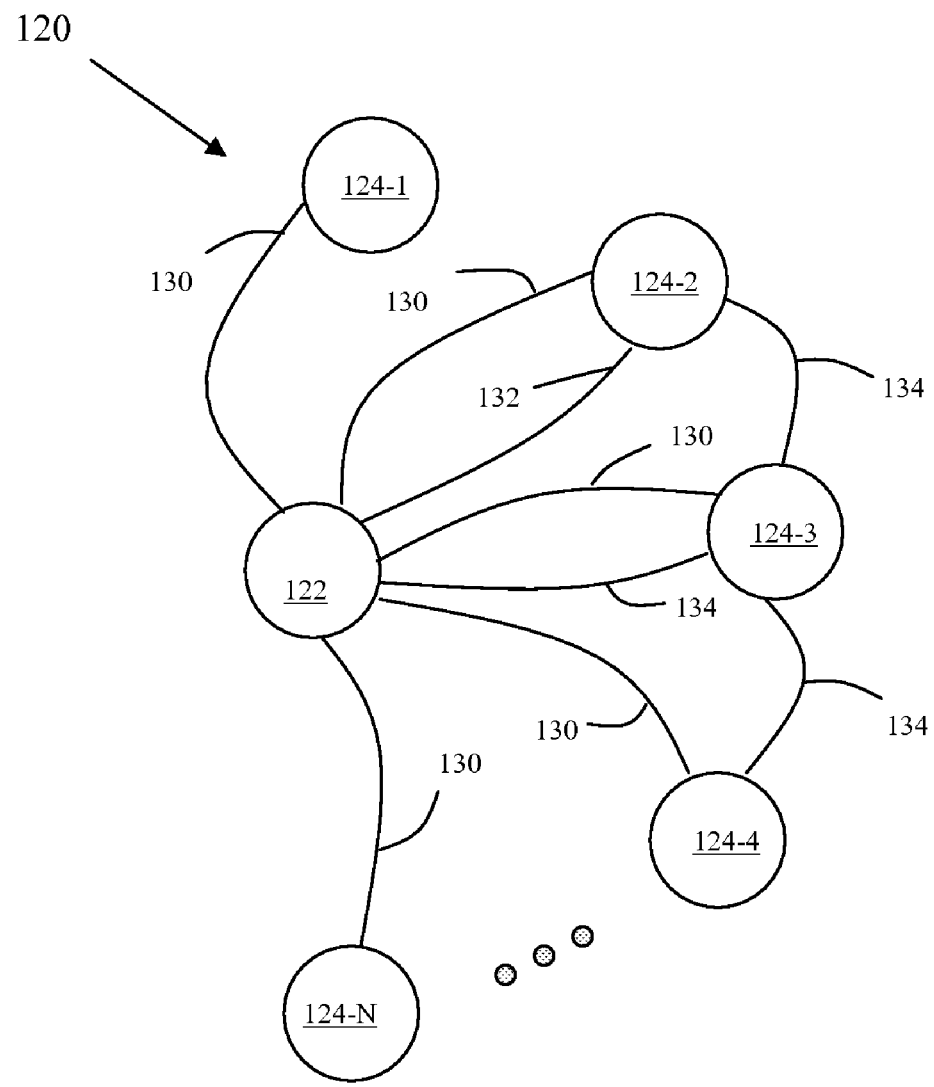
FIG. 1B is a diagram of another embodiment of a communication system of the present invention.

In one embodiment, the data communication system 100 is a point to point communication system where only two nodes are participating at a time. An example of this system in reference to the communication system 100 of FIG. 1A is when node 102 sends a first signal 110-1 to node 104-1 and then a second signal 112-1 at a later time to node 104-2. In another embodiment of the present invention, the data communication system 120 is arranged in a broadcast network where a transmitted signal is received by multiple nodes simultaneously. An example of this is illustrated in FIG. 1B. In this embodiment, only a single frame preamble is required since only one initial transmission signal is sent to the multiple nodes. Referring to FIG. 1B, an initial signal 130 including the single frame synchronization communication signal is broadcast from node 122 to nodes 124-1 through 124-N simultaneously. In this embodiment, a switch point in the transmitted frame communication signal is used to indicate the start of the residual synchronization period. For example, in the communication system 120 of FIG. 1B, the next node to transmit, as directed by the switch point, is node 124-2. As illustrated, a ranging signal 132 is transmitted from node 124-2 to node 122. Further in this example, node 124-3 is then directed to transmit ranging signal 134, which is received by nodes 124-2, 124-4 and 122.

Referring to FIG. 2A, an example of a frame communication signal 200 is illustrated. In particular, the initial signal in this embodiment is a communication frame 200. An initial communication frame includes a frame preamble and a sub-frame containing data bits and a switch point. The initial communication frame 200 is sent from a transmitting node (first node) and includes frame preamble 202. Frame preamble 202 contains information used by one or more receiving nodes for synchronization of the receiving node(s) local clock(s). After the frame preamble, information or data is transmitted. The information or data is generally referenced as 204-1 through 204-N and in one embodiment are data communication bits. After the data 204-1 through 204-N has been transmitted, a switch point is transmitted 206. The switch point 206 indicates another node may now transmit in this sub-frame according to a pre-determined schedule. As described in the '281 application, the switch point initiates a link reversal or duplexing, which instructs a particular receiving second node to change into a transmitting node and the initial transmitting node to change into a receiving node. When the switch point indicates the start of the residual synchronization period, all nodes refer to the schedule exchanged during data communications to determine the order and time sequence of transmission by the nodes.

FIG. 2B illustrates the transmission of ranging signals 212-0 through 212-N by one or more nodes, according to the schedule, during the residual synchronization period (or ranging mode period) initiated by switch point 206. As illustrated, the ranging signals 212-0 through 212-N occur at nearly equal time intervals. As those of skill in the art will understand, the number, sequence and timing of the ranging signals, and which node is to transmit the ranging signal(s) is entirely determined by the schedule, and is not a limitation of the present invention. Following scheduled transmission the last ranging signal 212-N, the schedule includes a time period 214 with no scheduled ranging signal transmissions, during which the last transmitted ranging signal propagates to all receiving nodes. Subsequently, a selected node may transmit a frame preamble 202 to repeat the data exchange and ranging signal sequence according to the exchanged schedule.

Figure 3:
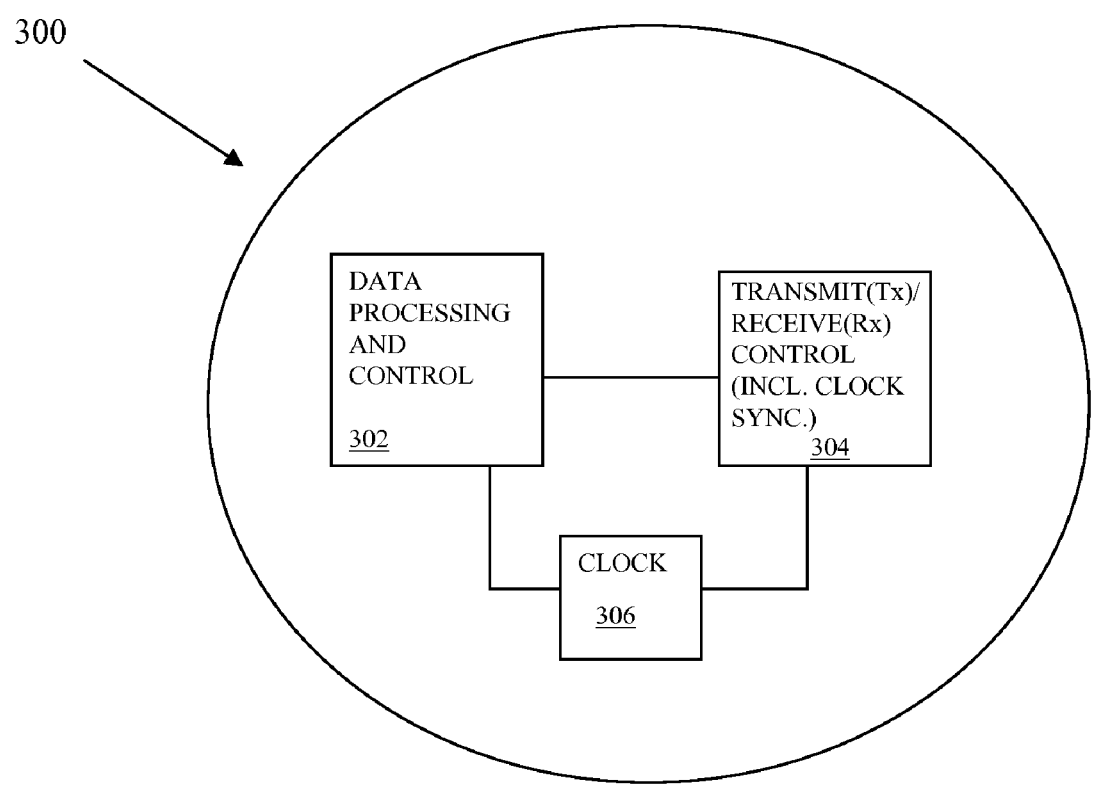
FIG. 3 is communication node of one embodiment of the present invention.

FIG. 3, illustrates one embodiment of a node 300 of the present invention. Node 300 includes a data processing and control circuit 302, a transmit (Tx)/receive (Rx) circuit 304 and a local clock 306. The Tx/Rx circuit 304 includes a local clock synchronization circuit, which processes the received preamble from a transmitting node for the purpose of synchronizing the local clock 306. As illustrated the clock 306 is used by both the control circuit 302 and the Tx/Rx circuit 304. The Tx/Rx circuit uses the clock, for among other things, to determine time intervals between data. The control circuit 302 uses the clock among other things, to determine when to send and pass received data, and time-related scheduling of the node during the residual synchronization period.

Figure 4:
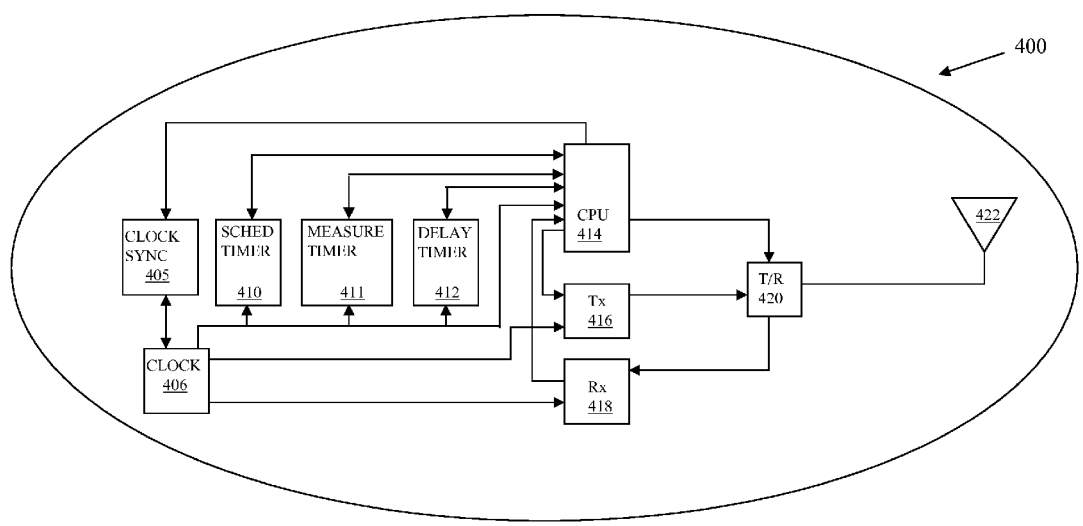
FIG. 4 is a communication node of another embodiment of the present invention.

An example of a more detailed node 300 of one embodiment of the present invention is illustrated in FIG. 4. Node 400 includes an antenna 422, a transmit (T)/receive(R) switch 420, a CPU 414, a Tx 416, a Rx 418, a clock synchronization circuit 405, a local clock 406, and local timers for scheduling 410, measurement 411 and delay 412. The CPU 414 controls the T/R switch 420 and timers 410, 411 and 412, and responds to indications from the clock 406 and timers 410, 411 and 412. When node 400 is transmitting the T/R switch 420 is placed in a transmitting position, and when node 400 is receiving the T/R switch 420 is placed in a receiving position.

Figure 5:
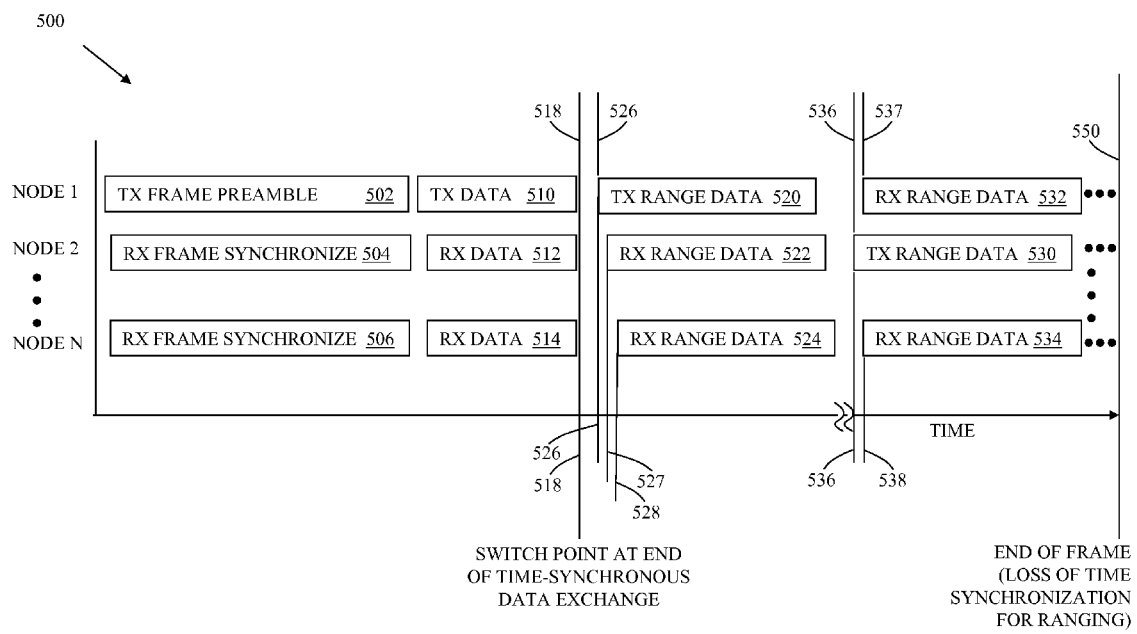
FIG. 5 is a graph illustrating communications and ranging of one embodiment of the present invention.

The embodiment of FIG. 5 illustrates a graph 500 depicting one possible set of time relationships among and between nodes during the frame preamble, data communication exchange and ranging signals. All possible relationships between and among nodes, such as nodes 102 and 104-n in FIG. 1, and nodes 122 and 124-n in FIG. 2, are not knowable in advance, hence it must be understood that due to the dynamic and self-configuring nature of such a system, numerous other operational modes, in addition to the one described, are possible and are to be included by this disclosure.

The embodiment of FIG. 5, illustrates the signaling between a first node and a one or more other nodes. The first node sends a frame preamble 502 to begin communications. In response to the frame preamble 502, one or more other nodes synchronize local clocks when receiving the frame preamble 504 and 506. Data, including but not limited to, a schedule for the residual synchronization period, is then transmitted 510 by the first node in a sub-frame. One or more other nodes receive the sub-frame data 512 and 514. One or more link reversals, or switch points, may occur, as described in the '281 application.

A specific switch point 518 indicates the start of the residual synchronization period, and all participating nodes utilize the previously exchanged schedule to determine when a specific node should be in either transmit or receive mode. A selected first node is than adapted to transmit a ranging signal 520 at a time 526 designated by the schedule, and a second node is adapted to receive the range data 522. Further, other nodes may also receive the range data 524 transmitted by the selected second node. Due to the physical separation of nodes in a wireless network and the finite propagation velocity of RF waves, there will be a time delay between the transmission of a preamble or data signal and when that signal arrives at one or more receiving nodes.

Since the local clocks in all participating nodes are time-synchronized, the elapsed time between the transmission of the ranging signal 526 by the first node, and reception of the ranging signal 527 and 528 by selected other nodes may be measured at each of the receiving nodes. In one embodiment, two such time delays 527 and 528 are indicated in FIG. 5. Time delay 527 is proportional to the range, or distance, between Node 1 and Node 2. A different time delay 528 is proportional to the range between Node 1 and Node N. Time delays 527 and 528 may then be used to compute the range between nodes.

Subsequently, according to the schedule, another node is selected to transmit a ranging signal 530 at a time 536. Selected other nodes receive the ranging signal 532 and 534 after time delays 537 and 538 respectively, and use the elapsed time measurements to compute the range between the nodes. The schedule for selecting nodes to transmit the ranging signal continues until the time-synchronization precision necessary for ranging is exceeded at 550. As will be understood by those of skill in the art, each node may be selected to transmit a ranging signal at one or more scheduled times, all without limitation.

Multiple sets of time measurements, obtained when different selected nodes transmit the ranging signal, may be exchanged between nodes as data 510 in subsequent communications frames for the purpose of computing relative positioning of the nodes Techniques including, but not limited to, trilateration and multilateration, may be used to determine relative positions of nodes.

Figure 6:
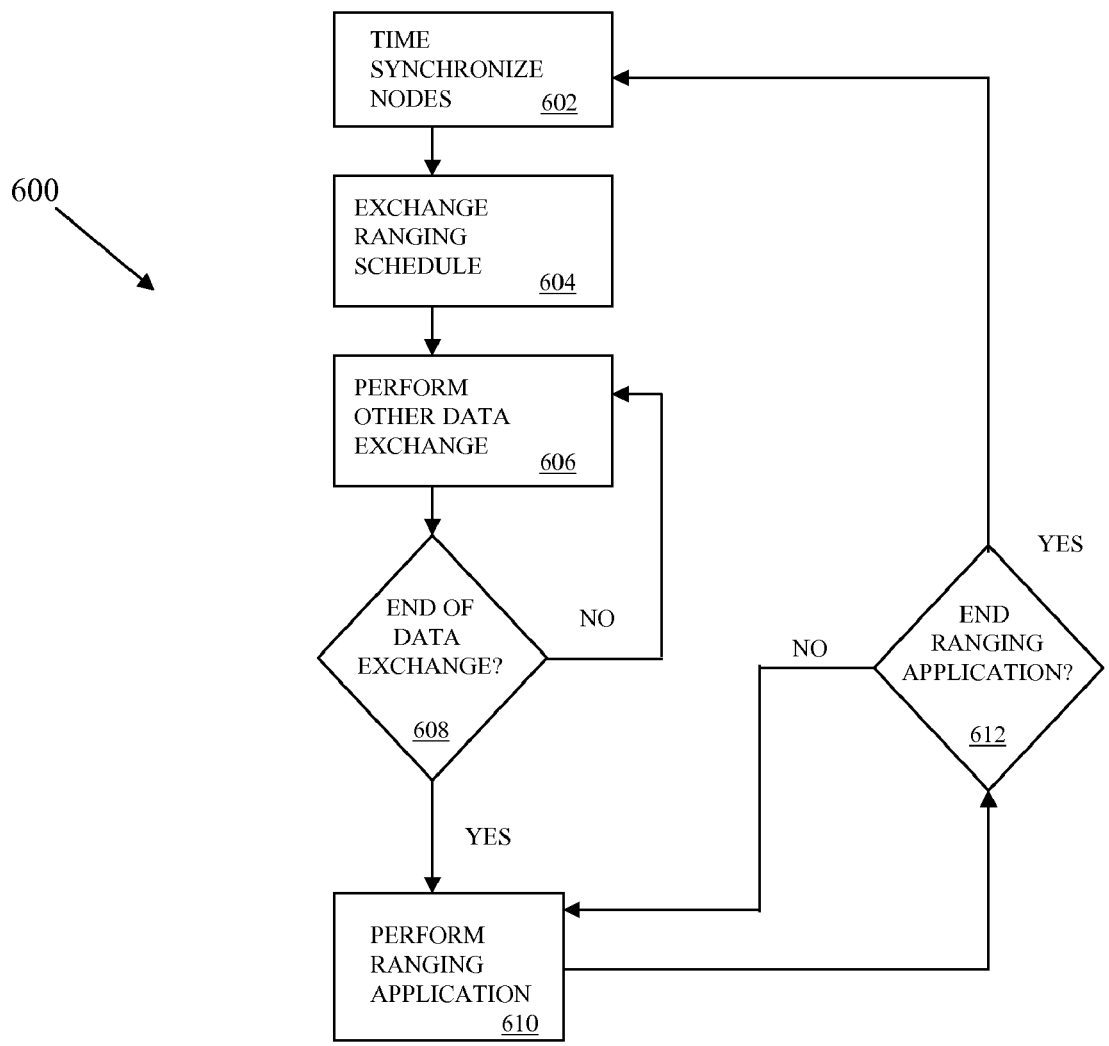
FIG. 6 is a flow diagram of communication and ranging among nodes in a communication system of one embodiment of the present invention.

Referring to FIG. 6, a processing flow diagram 600 of the system of one embodiment is illustrated. The processing diagram begins by time-synchronizing the cooperating nodes (602), as described in the '281 application. Once the nodes have been synchronized, data is exchanged with the transmitting node, such as a ranging schedule (604). As described in the '281 application, one or more switch points may occur to enable data exchange (606) among cooperating nodes. As those of skill in the art will understand, the exchange of the ranging schedule (604) is a special case of data exchange involving the initial transmitting node as described in the '281 application. Further, the amount of other data exchanged 606 may be from zero to an implementation-specific maximum amount, and vary with each time-synchronization period, all without limitation.

Subsequent to the residual synchronization period switch point, the ranging application (610) is performed, with each node acting in turn as described above. Upon completion of the ranging application (612), according to the exchanged ranging schedule (604), the process repeats as necessary, starting with time synchronization of nodes (602). As will be understood by those of skill in the art and described in the '281 application, each communications frame period may be used by the cooperating nodes for different purposes, as determined by the initial communicating node.

Figure 7:
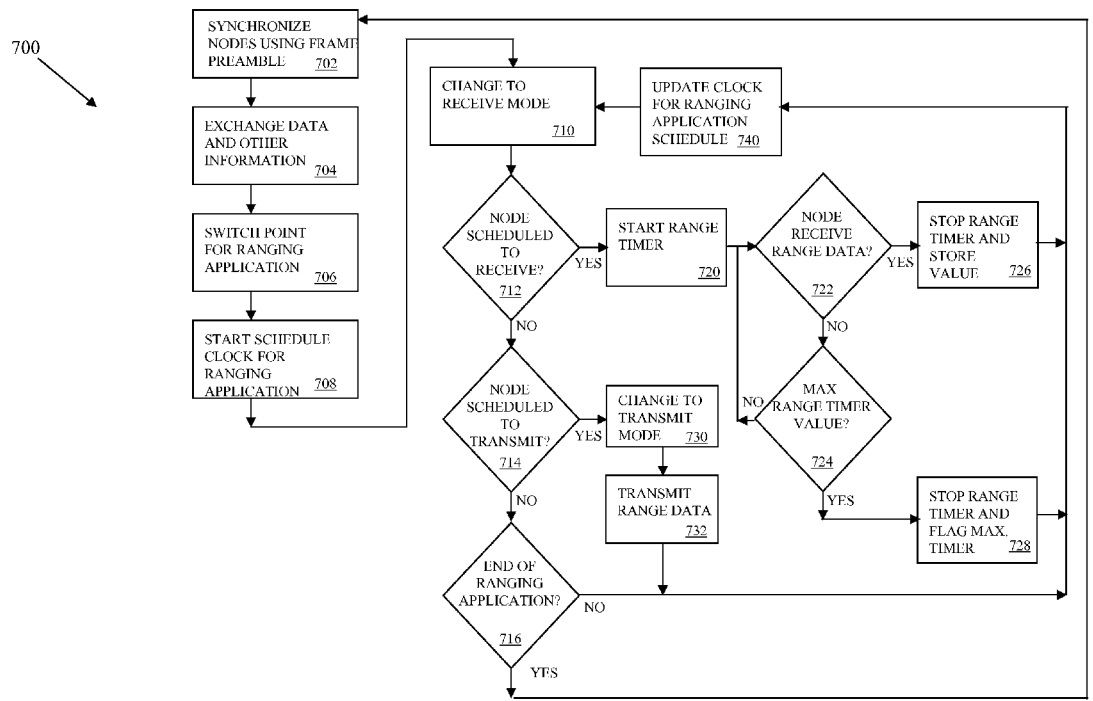
FIG. 7 is a flow diagram of the clock and timer control during the ranging of one embodiment of the present invention.

FIG. 7 illustrates one embodiment of a flow diagram for each cooperating node, including the initial communicating node described in the '281 application. Each such cooperating node receives and time-synchronizes (702) using the frame preamble transmitted by the initial communicating node. Per the '281 application, other data exchange may occur, such as a ranging schedule (704), followed by a switch point transmitted by the initial communicating node and received by the other nodes to initiate the ranging application (706). Each node starts a local schedule clock referenced to the local time-synchronized clock (702), for monitoring the ranging schedule, and switches to receive mode (710).

While in receive mode each node periodically compares the local schedule clock with the schedule, to determine if the node is expecting to receive a ranging signal (712), transmit a ranging signal (714) or end the ranging application (716).

If the node is scheduled to receive a ranging signal (712) the node starts a ranging timer (720), referenced to the local time-synchronized clock (702). The node remains in receive mode awaiting the arrival of the ranging signal (722). If the ranging signal is received, the node stops the range timer and stores the measured value (726). If the ranging signal is not received before the maximum value of the range timer is reached (724), then the node stops the ranging timer and sets a flag indicating the range timer value is at the maximum (728). The node remains in receive mode (710), after updating the schedule clock (740). Processing then returns to checking the schedule (712), (714) and (716).

If the node is scheduled to transmit a ranging signal (714), then the node switches to transmit mode and transmits the ranging signal. As those of ordinary skill in the art will understand, the format, duration and number of repetitions of the ranging signal are application-dependent, and are not a limitation of the present invention. The node switches back to receive mode (710), after updating the schedule clock (740). Processing then returns to checking the schedule (712), (714) and (716).

If the node is schedule to end the ranging application (716), then the node processing returns to the synchronization of nodes using a frame preamble (702). As described in the '281 application, a method is employed among the cooperating nodes to determine which node is the next initial communicating node.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of ranging between nodes, the method comprising:
   synchronizing two or more nodes with a frame preamble transmitted from one of the two or more nodes to the other of the two or more nodes;
   subsequently exchanging data and ranging schedule between the nodes, including data transmitted from at least one of the other nodes, without transmitting an additional frame preamble from any of the two or more nodes;
   starting a ranging schedule clock in each node in response to a switch point; and
   exchanging one or more range signals between the nodes based on the ranging schedule during a residual synchronization period, wherein the residual synchronization period is a period of time from the switch point until a second frame preamble is transmitted by one of the two or more nodes.

2. The method of claim 1, further comprising:
   periodically checking the ranging schedule in a node.

3. The method of claim 2, further comprising:
   determining if the node is scheduled to receive.

4. The method of claim 3, further comprising:
   when the node is scheduled to receive, starting a range timer.

5. The method of claim 4, further comprising:
   determining if the node received one or more ranging signals.

6. The method of claim 5, further comprising:
   when the node received range data, stopping the range timer and storing the range timer value.

7. The method of claim 5, further comprising:
   when the node did not receive range data, determining if the range timer has reached a maximum value for the range timer.

8. The method of claim 7, further comprising:
   when the range timer has reached its maximum value without receiving range data, stopping the range timer and setting a flag indicating that the range timer reached a maximum value.

9. The method of claim of claim 2, further comprising:
   when the node is not scheduled to receive range data, determining if the node is scheduled to transmit range data.

10. The method of claim 9, further comprising:
    when it is determined that the node is scheduled to transmit one or more ranging signals, changing the node to a transmit mode; and
    transmitting ranging signals.

11. The method of claim 9, further comprising:
    when it is determined that the node is not scheduled to transmit range data, determining if the schedule is at the end of the ranging application.

12. A method of communication with a node, the method comprising:
    synchronizing communication with at least one other node with a frame preamble transmitted from the node to the at least one other node,
    subsequently exchanging data in a frame between the node and the at least one other node without transmitting an additional frame preamble from the node or the at least one other node, the exchanged data including a ranging schedule and data transmitted from the at least one other node;
    entering into a ranging mode upon detection of a special switch point;
    implementing a schedule timer when the node is scheduled to receive a range signal; and
    transmitting range data when scheduled to transmit.

13. The method of claim 12, further comprising:
    implementing a start clock upon entering into the ranging mode.

14. The method of claim 13, further comprising:
    determining if the node is to end the ranging mode based on the schedule; and
    when the node is not scheduled to end the ranging mode, updating the start clock.

15. The method of claim 12, wherein implementing a schedule timer when the node is scheduled to receive a range signal further comprises:
    determining if the node received range data within a select time period tracked by the schedule timer; and
    indicating when the node did not receive the range data within the select time period.

16. A communication node comprising:
    a transmitter/receiver circuit adapted to selectively transmit and receive communication signals;
    a synchronization circuit adapted to synchronize the local clock with a first preamble in a received communication signal from at least one other communication node to establish communications between the communication nodes; and a control circuit adapted to control the transmitter/receiver circuit and the synchronization circuit, the control circuit being adapted to process communication signals, the control circuit further adapted to direct transmission and reception of communication signals between the communication nodes without any of the nodes transmitting a second preamble to re-synchronize the local clock until time synchronization suitable for ranging is lost, the control circuit further adapted to enter into a ranging mode during a residual synchronization period and implement a ranging schedule in response to a special switch point, wherein a residual synchronization period is a period of time from the special switch point until a second frame preamble is transmitted;

a start clock adapted to clock scheduling operations of the communication node when the communication node enters into the ranging mode; and a range timer adapted to track a time period when the node is scheduled to receive range data.

17. The communication node of claim 16, wherein the control circuit is further adapted to flag time periods in which the node does not receive ranging data pursuant to the schedule.

18. The communication node of claim 16, wherein the synchronization circuit is further adapted to resynchronize communication between the nodes upon completion of the ranging mode pursuant to the ranging schedule.

19. The communication node of claim 16, wherein the control circuit is further adapted to update the start clock pursuant to the ranging schedule.

20. The communication node of claim 16, wherein the control circuit is further adapted to direct the transmitter to transmit range information pursuant to the ranging schedule.

* * * * *